Figure 1:
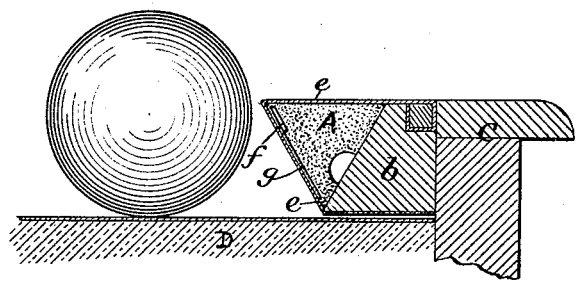

(No Model.)

M. BENSINGER.
BILLIARD CUSHION.

No. 481,094. Patented Aug. 16, 1892.

ATTEST:

INVENTOR:
Moses Bensinger
By J. N. McIntire
Attorney

UNITED STATES PATENT OFFICE.

MOSES BENSINGER, OF CHICAGO, ILLINOIS, ASSIGNOR TO THE BRUNSWICK-BALKE-COLLENDER COMPANY, OF SAME PLACE.

BILLIARD-CUSHION.

SPECIFICATION forming part of Letters Patent No. 481,094, dated August 16, 1892.

Application filed April 27, 1892. Serial No. 430,867. (No model.)

*To all whom it may concern:*

Be it known that I, MOSES BENSINGER, of Chicago, in the county of Cook and State of Illinois, have invented a certain new and useful Improvement in Cushions for Billiard-Tables; and I do hereby declare that the following is a full, clear, and exact description of the same, reference being had to the accompanying drawings, forming part of this specification.

As is well known to persons skilled in the art of making rubber billiard-cushion strips and familiar with their practical operation on billiard-tables, it is indispensably necessary that the strip of vulcanized rubber or other allied gum of which the cushion is mainly composed have combined with its face or working surface (in some proper manner) some ingredient or device which operates to harden it at the locality at which it receives the impact of the billiard-balls, in order that the angles of incidence and reflection of the balls in striking and rebounding from the cushion shall be as nearly equal as possible, while at the same time the cushion shall possess the capacity to repel the ball played against it with the greatest possible force, in order that the billiard-player may accomplish strokes involving a great number of cushions.

Previous to my present invention various means have been suggested and employed to effectuate this face hardening of the rubber cushion-strips, involving combinations therewith of a great variety of devices and materials arranged in different ways and united with the rubber strips sometimes in one and sometimes in another manner. I propose to provide for use a cushion-strip composed of the usual body portion of vulcanized rubber, but made with a different working face than that of any billiard-cushion heretofore made that I know of and adapted to repel or throw off the billiard-ball with a greater degree of force in proportion to the force with which the ball may be driven against the cushion than the most approved cushion-strip heretofore made.

To this main end and object my invention may be said to consist, essentially, in the combination, with the usual rubber body portion of the cushion, of a strip of what is known in the market and in the arts as "vulcanized fiber," arranged so as to operate as a face-hardening device and properly held in place relatively to the rubber strip, all as will be hereinafter fully explained, and as will be most particularly pointed out in the claims of this specification.

To enable those skilled in the art or manufacture to which my invention relates to fully comprehend and practice the same in the manufacture and use of the improved cushion for billiard-tables devised by me, I will now proceed to more fully describe my said invention, referring by letters to the accompanying drawings, in which I have shown the same carried out in those precise forms in which I have so far practiced and contemplate practicing it, though my improved cushion-strip may be modified more or less with reference to its shape, as well as to the sizes, proportions, and precise modes shown of combining its parts.

Figure 2:
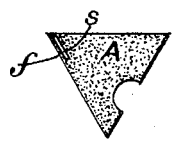
Figure 3:
Figure 4:
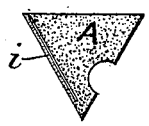

In the drawings, Figure 1 is a vertical cross-section of a cushion made according to my invention. Fig. 2 is a similar view showing a modification thereof. Fig. 3 is a like view showing another modification, and Fig. 4 is the same sort of view illustrating still another modification.

In all the figures the same letter will be found to designate the same part of the compound cushion.

At Fig. 1 I have shown my improved cushion-strip as applied to the rail of a billiard-table, while in the other figures I have shown only the compound strip itself for the purpose merely of illustrating different forms of the novel combination of ingredients constituting my improvement.

A is the main or body portion of the strip, which is composed of vulcanized rubber, as usual, and which, as shown at Fig. 1, is securely fastened to the wooden strip *b* of the rail *c* of the billiard-table, of which latter D is part of the bed. The body portion A of the cushion is made of any approved shape and size, though, preferably, about as shown in the drawings, and the finished cushion-strip is, as usual, covered over with the green (or other colored) cloth *e* ordinarily used to cover both the cushions and the beds of billiard-tables.

At Fig. 1, *f* represents a narrow strip of the material known in the market and in the arts as "vulcanized fiber" and quite commonly used nowadays (sometimes alone and sometimes in combination with rubber) for the frictional bearing-surfaces of band-brakes, for packings, &c., and $g$ represents a strip of canvas or other woven fabric the upper part of which envelops the strip $f$ and which extends downwardly to or nearly to the root of the cushion-strip in a plane parallel with and only a short distance in rear of the plane of the extreme outer or front portion of the cushion-strip. As shown, the strip of vulcanized fiber $f$ (which of course is equal in length to the length of the cushion-strip and which is surrounded or completely enveloped by the upper portion of the canvas strip $g$) is tied down to the root of the cushion or is held against any tendency to rise unduly after the same fashion in which such canvas strips have heretofore been used in combination with the same sort of rubber body portions and fillets or strips of steel arranged similarly to the strip $f$ of vulcanized fiber.

In the course of construction of the cushion or in the manufacture thereof the same process or method of making the cushion may be followed as is now and has heretofore been practiced in the manufacture of cushion-strips very similar to the one shown at Fig. 1, except as to the use of a strip of metal or a strip of hard-rubber compound in place of the strip I have shown at $f$ of vulcanized fiber.

In the modification shown at Fig. 2 the strip of vulcanized fiber $f$ is first jacketed or covered with a textile fabric woven or braided tightly round about it and then incorporated in the cushion-strip, as illustrated. This method of carrying into effect my novel combination of devices or ingredients may be found a very efficient one in practice, since the strip $f$ of vulcanized fiber may be enveloped or covered by a textile fabric fitting very tightly to the strip, and as in the process of vulcanization to which all the united or combined parts are, as usual, subjected this tight-fitting textile jacket will become very securely united with the surrounding rubber the result will be a very permanent or durable union of the face-hardening strip with the rubber body of the cushion. Of course in making the cushion-strip, as shown at Fig. 2, the strip $g$ of canvas (seen at Fig. 1) or any other suitable means may be added to effectuate the tying down to the root of the cushion of the strip $f$.

In the modified form of my invention shown at Fig. 3 a strip of canvas or other suitable inelastic but not too closely-woven fabric $g^2$ is used, of a width sufficient to permit the double wrapping of its upper portion around the vulcanized-fiber strip $f$ and yet extend downward toward the root of the cushion sufficiently to effectually tie down the strip $f$ and, as usual, properly lessen the stretching capacity of the face of the rubber strip A, and this form of the invention or this mode of carrying into effect my improvement may be found a very desirable one, since by the double wrapping of the fabric $g^2$ around the strip $f$, as set forth, a better opportunity is afforded to very tightly incase the strip $f$ within the fabric $g^2$, that in turn is easily united in a very permanent or relatively-immovable manner with the mass of rubber composing the cushion-strip.

At Fig. 4 the modification shown comprises simply the combination, with the rubber body A, of a broad strip $i$ of the vulcanized fiber arranged so as to not only harden the face of the cushion at the locality at which the balls strike the latter, but also perform the function of rendering the face of the cushion-strip below the line of impact of the balls less capable of either stretching upwardly or changing its shape too abruptly under the action of the balls played against the cushion. In this modification one or more layers or strips of canvas, such as heretofore commonly used, may be incorporated in the rubber strip, either in front or in rear or on both sides of the strip $i$, for the purposes well understood.

In practicing my invention so far I have in the form of cushion shown at Fig. 1 used a strip of vulcanized fiber about three-sixteenths of an inch wide and about one sixty-fourth of an inch thick; but the width and thickness of this strip $f$ may of course be varied more or less, and according to the experience and judgment of the manufacturer the width of the vulcanized-fiber face-hardening strip or ribbon may be considerably increased if it be desirable to materially modify the action of the cushion. With the cushions made, however, about as I have so far made them I have found it quite practicable for the skilled player to make the cue-ball take eleven cushions on a "five-by-ten" table.

Having now so fully explained my improved cushion-strip that any one skilled in the art can easily understand and practice my invention, what I claim as new, and desire to secure by Letters Patent, is—

1. In a billiard-cushion strip, the combination, with the usual rubber body portion A, of a face-hardening strip composed of the material or substance known as "vulcanized fiber," the said strip being arranged substantially as hereinbefore set forth.

2. In a cushion-strip provided with a face-hardening strip of vulcanized fiber, the combination of the body portion A, the strip of vulcanized fiber $f$, and a strip of canvas or other suitable textile fabric, which envelops the strip $f$, all substantially as and for the purposes set forth.

In witness whereof I have hereunto set my hand this 18th day of April, 1892.

MOSES BENSINGER.

In presence of—
 CHAS. P. MILLER,
 H. F. DAVENPORT.